US012771168B2

(12) United States Patent
Juchem et al.

(10) Patent No.: US 12,771,168 B2
(45) Date of Patent: Oct. 20, 2026

(54) ENERGY SUPPLY DEVICE FOR AN ELECTROLYSIS UNIT AND ELECTROLYSIS INSTALLATION

(71) Applicant: SMA Solar Technology AG, Niestetal (DE)

(72) Inventors: Ralf Juchem, Felsberg (DE); Andreas Falk, Kassel (DE); Bernhard Voll, Lohfelden (DE)

(73) Assignee: SMA Solar Technology AG, Niestetal (DE)

( * ) Notice: Subject to any disclaimer, the term of this patent is extended or adjusted under 35 U.S.C. 154(b) by 156 days.

(21) Appl. No.: 18/908,008

(22) Filed: Oct. 7, 2024

(65) Prior Publication Data

US 2025/0030355 A1 Jan. 23, 2025

Related U.S. Application Data

(63) Continuation of application No. PCT/EP2023/059755, filed on Apr. 14, 2023.

(30) Foreign Application Priority Data

May 5, 2022 (DE) ..................... 10 2022 111 107.5

(51) Int. Cl.

| | |
|---|---|
| ***H02J 15/50*** | (2026.01) |
| ***C25B 1/04*** | (2021.01) |
| ***C25B 9/65*** | (2021.01) |
| ***H02J 3/38*** | (2006.01) |
| ***H02M 7/23*** | (2006.01) |

(52) U.S. Cl.
CPC ................ *H02J 15/50* (2026.01); *C25B 1/04* (2013.01); *C25B 9/66* (2021.01); *H02J 3/381* (2013.01); *H02M 7/23* (2013.01)

(58) Field of Classification Search
CPC .......... H02M 7/23; H02M 7/003; H02M 7/08; H02M 7/125; H02M 7/21; H02J 15/50; H02J 3/381; C25B 9/66; C25B 1/04
See application file for complete search history.

(56) References Cited

U.S. PATENT DOCUMENTS

| | | | | |
|---|---|---|---|---|
| 2021/0140057 | A1* | 5/2021 | Utz | C25B 1/04 |
| 2022/0368243 | A1 | 11/2022 | Unru et al. | |
| 2023/0231491 | A1 | 7/2023 | Falk | |

FOREIGN PATENT DOCUMENTS

| | | | | | |
|---|---|---|---|---|---|
| CN | 202930937 | U | 5/2013 | | |
| DE | 897696 | C | 11/1953 | | |
| DE | 102020124964 | A1 | 3/2022 | | |
| DE | 102020103076 | A1 | 11/2022 | | |
| EP | 2228894 | A1 | 9/2010 | | |
| EP | 3556905 | A1 | 10/2019 | | |
| GB | 679879 | A | * | 9/1952 | C25B 15/00 |
| GB | 778989 | A | 7/1957 | | |
| WO | WO-2009144266 | A1 | * | 12/2009 | H02M 7/19 |

OTHER PUBLICATIONS

International Search Report dated Jul. 6, 2023, for International Application No. PCT/EP2023/059755.

* cited by examiner

*Primary Examiner* — Gary L Laxton
*Assistant Examiner* — Jennifer C Caulk
(74) *Attorney, Agent, or Firm* — Eschweiler & Potashnik, LLC

(57) ABSTRACT

The disclosure describes an energy supply device for an electrolysis unit and an electrolysis installation comprising the energy supply device and an electrolysis unit connected thereto.

16 Claims, 3 Drawing Sheets

ENERGY SUPPLY DEVICE FOR AN ELECTROLYSIS UNIT AND ELECTROLYSIS INSTALLATION

REFERENCE TO RELATED APPLICATIONS

This application is a Continuation of International Application number PCT/EP2023/059755, filed on Apr. 14, 2023, which claims the benefit of German Application number 10 2022 111 107.5, filed on May 5, 2022. The contents of the above-referenced patent applications are hereby incorporated by reference in their entirety.

FIELD

The patent application relates to an energy supply device for an electrolysis unit and to an electrolysis installation having such an energy supply device.

BACKGROUND

Hydrogen can be produced from water by supplying electrical energy and by electrolytic decomposition. Industrial hydrogen production is often carried out using an electrolyzer, which is supplied via a rectifier from an energy supply grid—for example, a medium-voltage grid. It is known that electrolyzers are subject to aging effects, which for a given DC input voltage manifest in a decrease in the hydrogen production rate of the electrolyzer over the course of aging. The hydrogen production rate depends directly upon the current throughput of the electrolyzer and typically increases with increasing DC input voltage of the electrolyzer. In order to be able to achieve a specified hydrogen production rate even as the electrolyzer ages, its DC input voltage must therefore be increased.

The problem of the age-related increase in the supply voltage of the electrolyzer is conventionally solved in the prior art in that a transformer via which the rectifier is connected to the energy supply grid has a so-called tap changer. The tap changer, which is usually located on the primary side of the transformer, can be used to change the transformation ratio of the transformer. In this way, a voltage amplitude of the alternating voltage provided to the rectifier on its AC side can be increased (or decreased) over time. By increasing the alternating voltage amplitude, the aging effects of the electrolyzer can be at least partially compensated for without the rectifier having to be operated with significantly higher conversion losses as the electrolyzer ages.

In addition to the electrolyzer, the electrolysis unit also includes auxiliary units, such as cooling devices, pumps, heating devices, etc., which provide and discharge the media required by the electrolyzer with a specified quality (pressure, temperature, etc.). The electrical supply of the auxiliary units is usually provided via a standardized alternating voltage (e.g., 400 V, 480 V), which typically has a narrow tolerance range with respect to its voltage amplitude. By changing the transformation ratio of the transformer via the primary-side tap changer, this also has an influence on the secondary-side alternating voltage supplying the auxiliary units, as this is also increased and would leave the permitted tolerance range without further countermeasures.

In order to avoid an increase in the alternating voltage used for the auxiliary units, a design of an electrolysis installation 150 with an energy supply device 100 and an electrolysis unit 120 according to FIG. 1 is known. The energy supply device 100 includes two separate transformers 102, 104, each of which is connected with its primary side to an energy supply grid 40 via a grid connection 115 of the energy supply device 100. An electrolyzer 22 of the electrolysis unit 120 is supplied with a DC input voltage $U_{DC,EL}$ via the first transformer 104. For this purpose, the first transformer 104 is connected on the secondary side via an AC isolation unit 105, an AC/DC converter 106, a DC isolation unit 112, and a DC voltage output 116 of the energy supply device 100 to a DC voltage input (DC input) 21 of the electrolyzer 22, with which the electrolyzer 22 of the electrolysis unit 120 is supplied. The second transformer 102 serves to supply auxiliary units 23, 24 of the electrolysis unit 120 with a standardized alternating voltage and is connected for this purpose on the secondary side to the auxiliary units 23, 24 of the electrolysis unit 120 via an auxiliary power output 117 of the energy supply device 100. Only the first transformer 104, but not the second transformer 102, has a tap changer to compensate for aging effects of the electrolyzer 22. Although the second transformer 102 does not require a tap changer, and its nominal power is usually designed to be significantly lower than that of the first transformer 104, and although the two transformers 102, 104 do not necessarily have to be designed as multiple-winding transformers, the solution as a whole is nevertheless cost-intensive, in particular if the energy supply grid 40 is a medium-voltage grid, and the second transformer 102 is designed as a separate medium-voltage transformer.

Another conventional variant of an electrolysis installation 250 with an energy supply device 200 and an electrolysis unit 220 is shown in FIG. 2. The supply unit 200 here includes a transformer 202 designed as a multi-winding transformer with a first and a second secondary side, which is connected on the primary side to an energy supply grid 40 via a grid connection 215 of the energy supply device 200. The auxiliary units 23, 24 of the electrolysis unit are supplied via the first secondary side of the transformer 202. The second secondary side serves to supply the electrolyzer 22 of the electrolysis unit 220 with a DC input voltage $U_{DC,EL}$. For this purpose, it is connected to the DC input 21 of the electrolyzer 22 via an AC isolation unit 205, an AC/DC converter 206, a DC isolation unit 212, and the DC voltage output 216 of the energy supply device 200. To compensate for aging effects of the electrolyzer 22, the transformer 202 has a tap changer on the primary side, with which a voltage amplitude of the alternating voltage provided to the AC/DC converter 206 is increased. So that the change in the transformation ratio by the tap changer of the transformer 202 has no influence on the alternating voltage of the auxiliary units 23, 24 connected to the auxiliary power output 217, the second transformer 204 also has a tap changer. The tap changer of the second transformer 204 is now operated in the opposite direction to the tap changer of the transformer 202, whereby the alternating voltage on the secondary side, facing the auxiliary units 23, 24, of the second transformer 204 is again lowered. This allows the voltage increase of the transformer 202 when supplying the auxiliary units 23, 24 to be compensated for and reset to the standardised value required by the auxiliary units. In this conventional variant, a low-voltage transformer, which does not necessarily have to be designed as a multiple-winding transformer, can be used as the second transformer 204. However, it must also have the additional tap changer. Such transformers equipped with a tap changer are generally more expensive than transformers without a tap changer. In summary, the conventional solutions according to FIGS. 1 and 2 are complex, costly, and often error-prone to implement.

The publication CN 202930937 U discloses an energy supply system for an electrolysis tank. The system includes an alternating current step-down station, a power conversion station for converting alternating current into direct current, and the electrolysis tank. The power conversion station includes sampling circuits for an input-side alternating current and an input-side alternating voltage, a load voltage regulator, a rectifier transformer, a rectifier, a controller, a filter and power compensation device, and sampling circuits for an output-side direct current and an output-side direct voltage. The power conversion station is designed in such a way that power loss of the rectifier transformer due to harmonics is significantly reduced.

The publication WO 2009/144266 A1 discloses a three-phase rectifier circuit with two or more transformers, which are connected in parallel to one another on the primary side to an alternating current grid, and are each connected on the secondary side to at least one semiconductor rectifier bridge. The rectifier bridges connected to different transformers are connected in series on the DC side in order to supply DC power to a consumer device. One of the rectifier bridges is a thyristor rectifier bridge, while the remaining rectifier bridge(s) are diode rectifier bridges.

GB 778989 A discloses an electrolysis installation with multiple electrolytic loads, wherein each of the electrolytic loads is supplied via its own multiphase rectifier by a separate star-connected group of secondary windings of a transformer. The transformer has two groups of primary windings connected to a three-phase supply. If an error occurs, only the affected consumer is switched off.

The document DE 897 696 B discloses an electrolysis device with an electrically driven pump, a liquid container, and an electrolysis cell, which is fed with liquid from the container by the pump. The electrolyzer contains a grid transformer, a rectifier, and a voltage regulator to supply power to the electrolyzer cell, as well as an auxiliary transformer and a rectifier to operate a motor that pumps the brine through the cell.

SUMMARY

The disclosure is directed to an energy supply device for an electrolysis unit which, despite progressive aging of the electrolyzer, does not generate any, or at least no significant, increase in conversion-related power loss when supplying energy to the electrolyzer. The energy supply device, in one embodiment, is also as cost-effective as possible. The disclosure is also directed to an electrolysis installation having these properties.

An energy supply device according to the disclosure for an electrolysis unit comprises:

- a grid connection terminal configured to connect to the energy supply device to an energy supply grid,
- a DC voltage output terminal configured to connect the energy supply device to an electrolyzer of the electrolysis unit, and
- an auxiliary power output terminal configured to connect the energy supply device to at least one auxiliary unit of the electrolysis unit.

The energy supply device further comprises in one embodiment a first multi-winding transformer with a primary side, connected to the grid connection of the energy supply device, and a secondary side which has a first secondary-side connection and a second secondary-side connection galvanically isolated therefrom. The first secondary-side connection is connected to the auxiliary power output terminal and is configured to provide an alternating voltage with a first voltage amplitude $\hat{U}_1$. The second secondary-side connection is connected to an AC connection of a first AC/DC converter operating as a rectifier and is configured to provide an alternating voltage with a second voltage amplitude $\hat{U}_2$. The DC connection of the first AC/DC converter is connected to the DC output terminal of the energy supply device. The energy supply device also comprises a second transformer with a primary side, connected to the grid connection terminal, and a secondary side. The secondary side of the second transformer has a third secondary-side connection which is configured to provide an alternating voltage with a third voltage amplitude $\hat{U}_3$ and which is connected to an AC connection of a second AC/DC converter. The DC connection of the second AC/DC converter is connected to the DC output terminal. The primary side and the first secondary-side connection of the first multi-winding transformer or the primary side and the secondary side of the first multi-winding transformer each do not have a tap changer.

In addition to the first multi-winding transformer and the second transformer, the energy supply device can also comprise one or possibly a plurality of additional transformers. The one or more further transformers can each be connected with their primary side to the grid connection terminal and with their secondary side to the DC voltage output terminal of the energy supply device via in each case an AC/DC converter operating as a rectifier, or, in the case of transformers each having two galvanically isolated secondary-side connections, also via two AC/DC converters operating as rectifiers in each case. The further transformers can each be configured as a multi-winding transformer. The further transformers can, but do not necessarily have to, each have a tap changer.

A multi-winding transformer is a transformer that contains more than one winding on its primary side and/or on its secondary side for each phase of the alternating voltage. For example, a three-winding transformer may comprise, for each phase, one winding on its primary side and two windings on its secondary side. Accordingly, a four-winding transformer can have two primary-side windings and two secondary-side windings per phase. In the multi-winding transformers referred to here, the two secondary-side windings for each phase are typically galvanically isolated from each other. Alternatively, however, it is also possible for one or more of the multi-winding transformers to each have two secondary windings connected in parallel. If there are two primary windings per phase, e.g., in a four-winding transformer, these can be galvanically connected to each other and, in particular, connected in parallel to each other. With a multi-winding transformer, which has two galvanically isolated secondary windings for each phase, it is possible to transform an alternating voltage at the primary side into two secondary-side alternating voltages with different voltage amplitudes using two different transformation ratios.

For the electrolysis reaction, the electrolyzer employs chemical media of a predefined chemical and/or physical quality. The media are converted into other media by the electrolysis reaction, which, once converted, must be transported away again. An auxiliary unit of the electrolysis unit serves to supply chemicals to the electrolyzer and is a unit which is required to deliver the chemical media to the electrolyzer and/or to transport chemical media away from the electrolyzer. Alternatively or cumulatively, it is also possible for the auxiliary unit to be used for the preparation of the chemical media so that they achieve and/or maintain their predefined chemical or physical quality. Such an auxiliary unit, as used for example in the electrolytic production of hydrogen from water, can therefore comprise for example a gas pump, a liquid pump, a gas compressor, a gas drying unit, a cleaning unit for water purification, a cooling unit, or a heating unit. The electrolysis unit can usually contain a plurality of identical and/or different auxiliary units.

In the energy supply device according to the disclosure, the first multi-winding transformer serves to supply the auxiliary units of the electrolysis unit with an alternating voltage of the first voltage amplitude $\hat{U}_1$ via its first secondary-side connection. The second secondary winding and the alternating voltage of the second voltage amplitude $\hat{U}_2$ provided there is rectified via the first AC/DC converter and fed to the direct voltage output of the energy supply device, and subsequently to the DC input of the electrolyzer to supply it. The second transformer can be, but does not necessarily have to be, a multi-winding transformer. The alternating voltage with the third voltage amplitude $\hat{U}_3$ provided via it at the third secondary-side connection is rectified via the second AC/DC converter and also fed to the direct voltage output of the energy supply device, and subsequently to the DC input of the electrolyzer to supply it. The two AC/DC converters connected to the DC input of the electrolyzer do not have to be activated and supplying power to the electrolyzer at the same time. Rather, it is possible, at a low hydrogen production rate, and thus at a low power conversion relative to its nominal power, for the electrolyzer to be initially supplied by the second AC/DC converter and not the first AC/DC converter. Furthermore, it is possible for the first AC/DC converter to be connected to the second AC/DC converter only when the electrolyzer has a higher power conversion level, which is closer to the nominal power rating of the electrolyzer. Specifically, it is possible for the electrolyzer to be started up, and possibly also operated at partial load, using the second AC/DC converter but not the first AC/DC converter. By selecting the transformation ratios at the second and third secondary-side connections such that the second voltage amplitude $\hat{U}_2$ is greater, for example always greater, than the third voltage amplitude $\hat{U}_3$, a power loss occurring during operation of the electrolysis unit or the energy supply device can be minimised, wherein the entire operating range of the electrolyzer in its current-voltage diagram can be reached by at least one of the AC/DC converters-if necessary, also both AC/DC converters. This also applies to an age-related increase in the DC voltage to be provided at the DC input of the electrolyzer.

Since the primary side and the first secondary-side connection of the first multi-winding transformer or the primary side and the secondary side of the first multi-winding transformer each do not have a tap changer in one embodiment, the first voltage amplitude $\hat{U}_1$ of the alternating voltage applied to the first secondary-side connection is constant over time and invariant as the electrolyzer ages. It can therefore correspond to the standardized alternating voltage required for the auxiliary units of the electrolysis unit. In the case where the entire first multi-winding transformer also does not have a tap changer, this also applies in a corresponding form to the alternating voltage with the second voltage amplitude $\hat{U}_2$ applied to the second secondary-side connection. Therefore, the first multi-winding transformer can be designed cost-effectively. The second transformer can also be designed cost-effectively, especially if it is not designed as a multi-winding transformer and also does not have a tap changer. Nevertheless, in the energy supply device according to the disclosure, the first multi-winding transformer and the second transformer can in one embodiment be optimally utilized with regard to their energy provision. This applies for example to the first multi-winding transformer, which supplies the auxiliary units with its first secondary-side connection and the electrolyzer with its second secondary-side connection. In summary, this results in a cost-effective energy supply device for an electrolysis unit, the conversion losses of which do not increase significantly even with aging of the electrolyzer.

In one embodiment of the energy supply device, the second transformer can also be designed as a multi-winding transformer whose secondary side has a fourth secondary-side connection in addition to the third secondary-side connection. The fourth secondary-side connection is designed to provide an alternating voltage with a fourth voltage amplitude $\hat{U}_4$. It is connected to an AC connection of a third AC/DC converter, the DC connection of which is connected to the DC output terminal of the energy supply device. Advantageously, in one embodiment the fourth voltage amplitude $\hat{U}_4$ is smaller than the second voltage amplitude $\hat{U}_2$. It can be equal to the third voltage amplitude $\hat{U}_3$, but is advantageously different from it. In this way, the AC/DC converters can cover the operating range of the electrolyzer when generating the DC input voltage for the electrolyzer, in such a way that, during operation, each of the AC/DC converters covers a different voltage range in which it operates particularly efficiently and with low conversion losses. The voltage ranges of the different AC/DC converters can advantageously overlap. This does not mean that, in each voltage range, only the AC/DC converter assigned to that voltage range is operated. Rather, a plurality of, for example all, AC/DC converters can be operated simultaneously in individual voltage ranges or in each of the voltage ranges. However, the AC/DC converter assigned to this voltage range in particular is then operated with particularly low conversion losses relative to the other AC/DC converters. Regardless of whether the second transformer is a second multi-winding transformer or not, it can advantageously comprise a tap changer on its primary side or its secondary side. If the tap changer is arranged on the secondary side, the transformation ratio of only one of the secondary-side connections from the third secondary-side connection and the fourth secondary-side connection can be changed. Because the second transformer has a tap changer, otherwise increasing conversion losses that occur as the electrolyzer ages during operation of the energy supply device can be further minimized.

In another embodiment of the energy supply device, the first AC/DC converter can be designed as a transistor-based AC/DC converter. A transistor-based AC/DC converter has a bridge circuit with a plurality of bridge branches, each of which comprises a series connection of at least two transistors. Each of the transistors may have a separate or intrinsic diode connected in antiparallel to the transistor. For example, the transistors can each be designed as an insulated gate bipolar transistor (IGBT) or as a metal oxide semiconductor field effect transistor (MOSFET). During operation, a transistor-based AC/DC converter generates only a small amount of unwanted reactive power at its AC connection, which is transmitted as an interference signal either via the grid connection to the energy supply grid and/or from the first secondary-side connection to the second secondary-side connection. In any case, the interference signal of a transistor-based AC/DC converter is significantly less pronounced than that of a thyristor-based AC/DC converter. In addition, in contrast to the thyristor-based AC/DC converter, the transistor-based AC/DC converter is designed to generate a bidirectional power flow, i.e., it can operate not only in a rectifying mode but also in an inverting mode. In this way, it is also able to generate the desired reactive power in order to at least partially compensate for reactive power generated or present elsewhere. Since the first AC/DC converter is transistor-based, a particularly low interference signal is generated at the second secondary-side connection. Therefore, the interference signal cross-talking to the first secondary-side connection, which signal could adversely affect the operation of the auxiliary units there, is also relatively low. In addition to the first AC/DC converter, at least one further AC/DC converter, e.g., the second AC/DC converter and/or the third AC/DC converter, can optionally also be designed as a transistor-based AC/DC converter. In this way, it is possible to operate the second and/or the third AC/DC converter in such a way that it generates a compensating reactive power which at least partially compensates for an otherwise existing undesirable reactive power—for example, an undesirable reactive power at the grid connection.

In a further embodiment of the energy supply device, at least one of the AC/DC converters, also optionally each of the AC/DC converters, can be connected with its AC connection via an AC isolation unit having pre-charging means to the transformer assigned to it, consisting of the first multi-winding transformer and the second transformer. A pre-charging circuit is used to limit the current when switching on a capacitor that is not yet charged or not fully charged. Such pre-charging circuitry can be actively controlled or passive (uncontrolled). For example, a passively designed pre-charging means can have a path with a series connection of a pre-charging resistor and a switch, and a further switch connected in parallel to the series connection. An actively controlled pre-charging circuit can, for example, be a DC/DC converter which is designed to operate in a step-down manner in the power flow direction.

In a further embodiment of the energy supply device, a DC isolation unit can be arranged between each of the AC/DC converters and the DC voltage output terminal. However, it is not necessary for each of the DC isolation units to also include a pre-charging circuit. For example, a DC isolation unit, or possibly a plurality of DC isolation units, can be free of a pre-charging circuit. Such pre-charging circuitry within the DC isolation unit are usually provided to limit the current when switching on an electrolyzer, since the electrolyzer also exhibits a capacitive behavior at its DC input, in particular during its start-up phase. In the energy supply device provided here, it is in principle sufficient to provide only one of the DC isolation units with a pre-charging circuit, in particular the DC isolation unit which is activated when the electrolyzer is switched on. Capacitors of the DC connections of those AC/DC converters which have an open DC isolation unit and are therefore not yet conductively connected to the electrolyzer can be pre-charged via the corresponding AC isolation unit assigned to them, which comprises a pre-charging circuit. In this case, each of the DC isolation units associated with these AC/DC converters can only be closed when the electrical potentials of the two contacts of the corresponding DC isolation unit are so close to each other, and thus the voltage between the contacts is so low, that a high transient power flow can be avoided when the corresponding DC isolation unit is closed. Therefore, one or more of the corresponding DC isolation units can each be designed without a pre-charging means, whereby the energy supply device can be realized particularly cost-effectively.

In the energy supply device, it is possible for the second transformer to also be designed as a multi-winding transformer. If the first multi-winding transformer and the second transformer designed as a multi-winding transformer have the same nominal power, a plurality of identical transformers can be used within the energy supply device. However, the nominal power levels of the first multi-winding transformer and of the second transformer are often calibrated to the nominal power of the electrolyzer and the auxiliary units, and are therefore different from each other. Specifically, the nominal power of the first multi-winding transformer can exceed that of the second transformer.

In one embodiment the first multi-winding transformer of the energy supply device can be designed such that the second secondary-side connection has a higher nominal power than the first secondary-side connection. For example, the second secondary-side connection can have a nominal power that is different by at least 10%, for example at least 10% higher. It is particularly advantageous in one embodiment if the nominal power P(2S2) of the second secondary-side connection is higher by a factor of 1.5 to 2.5 than the nominal power P(2S1) of the first secondary-side connection, i.e., 1.5*P(2S1)≤P(2S2)≤2.5*P(2S1). This is the case for example when the nominal power of the electrolyzer significantly exceeds the nominal power of all auxiliary units of the electrolysis unit.

In one embodiment, the nominal power P(2S2) of the second secondary-side connection can also be greater than the nominal power P(4S3) of the third secondary-side connection, and also greater than the nominal power P(4S4) of the fourth secondary-side connection, if present. Specifically, for example, if the second transformer is designed as a second multi-winding transformer, the nominal power of the second secondary-side connection P(2S2) can be greater than half the total nominal power available at the secondary side of the further transformer, i.e., P(2S2)>0.5*[P(4S3)+P(4S4)]. This is particularly advantageous if the first AC/DC converter assigned to the second secondary-side connection is connected to the electrolyzer by closing the corresponding DC isolation unit only when the electrolyzer has a higher consumption, and therefore only when a higher DC voltage is present at the DC input of the electrolyzer.

If the nominal power P(2S2) of the second secondary-side connection exceeds the nominal power P(4S3) of the third and also the nominal power P(4S4) of the fourth secondary-side connection, the second voltage amplitude $\hat{U}_2$ at the second secondary-side connection can also be greater than the third voltage amplitude $\hat{U}_3$, and also greater than the fourth voltage amplitude $\hat{U}_4$, if present. This allows a different nominal power of the secondary-side connections to be preset, at least partially, via the different voltage amplitudes. The use of materials that would otherwise be necessary to increase the conductor cross-section at a higher nominal current can thus be compensated for, or at least reduced.

If the second transformer of the energy supply device is designed as a second multi-winding transformer, it is helpful, with a view to making the multi-winding transformer as easy to manufacture as possible, to design the secondary-side connections-here, the third and fourth secondary-side connections—with nominal powers that are as far as possible the same. However, in order to operate the electrolysis installation with the lowest possible conversion-related power loss of the energy supply device, it is advantageous not to design the nominal powers of the secondary-side connections to be the same, but to deliberately make them different, since this generates different DC voltages in the working range of the electrolyzer, at which at least one of the AC/DC converters connected to it operates as efficiently as possible. It has been found that a nominal power of the third secondary-side connection P(4S3) is advantageously designed to be different from the nominal power P(4S4) of the fourth secondary-side connection, but it should not differ by more than 40% from that of the fourth secondary-side connection. Specifically, it is therefore advantageous for the nominal power P(4S3) of the third secondary-side connection to correspond to a nominal power of the fourth secondary-side connection P(4S4) up to a factor of between 0.6 and 1.4, i.e., for the following to apply: 0.6*P(4S4)≤P(4S3) ≤1.4*P(4S4).

In one embodiment the energy supply grid can be a low-voltage grid, wherein the energy supply device, for example with respect to the first multi-winding transformer and the second transformer, is designed for connection to the low-voltage grid. However, if the nominal power of the electrolyzer is high, the energy supply grid can be a medium-voltage grid. In this case, the energy supply device can be designed for connection to the medium-voltage grid.

In one embodiment, the first multiple-winding transformer can be designed as a three-winding transformer with a primary winding and two separate, i.e., galvanically isolated, secondary windings, whereby the first multiple-winding transformer and thus also the energy supply device can be implemented particularly inexpensively. From a technical point of view, however, a four-winding transformer offers better decoupling of its secondary-side connections. For example, in the four-winding transformer, interference signals generated by the first AC/DC converter at its AC connection and thus present at the second secondary-side connection can have less crosstalk to the first secondary-side connection. Suppression of the interference signals from the second to the first secondary-side connection, and thus an interference-insensitive supply of the auxiliary units, is better possible in the four-winding transformer compared to the three-winding transformer. Alternatively, it is therefore also possible for the first multi-winding transformer to be designed as a four-winding transformer with two primary windings and two separate, i.e., galvanically isolated, secondary windings. The same applies to the second transformer.

An electrolysis installation according to the disclosure comprises an electrolysis unit with an electrolyzer and at least one auxiliary unit for chemical supply of the electrolyzer. The electrolysis installation also includes an energy supply device according to the disclosure, the direct voltage connection of which is connected to the electrolyzer and the auxiliary power output of which is connected to the at least one auxiliary unit of the electrolysis unit. This results in the advantages already listed in connection with the energy supply device.

BRIEF DESCRIPTION OF THE FIGURES

The disclosure is illustrated below with the aid of figures. In the figures.

DETAILED DESCRIPTION

Figure 1:
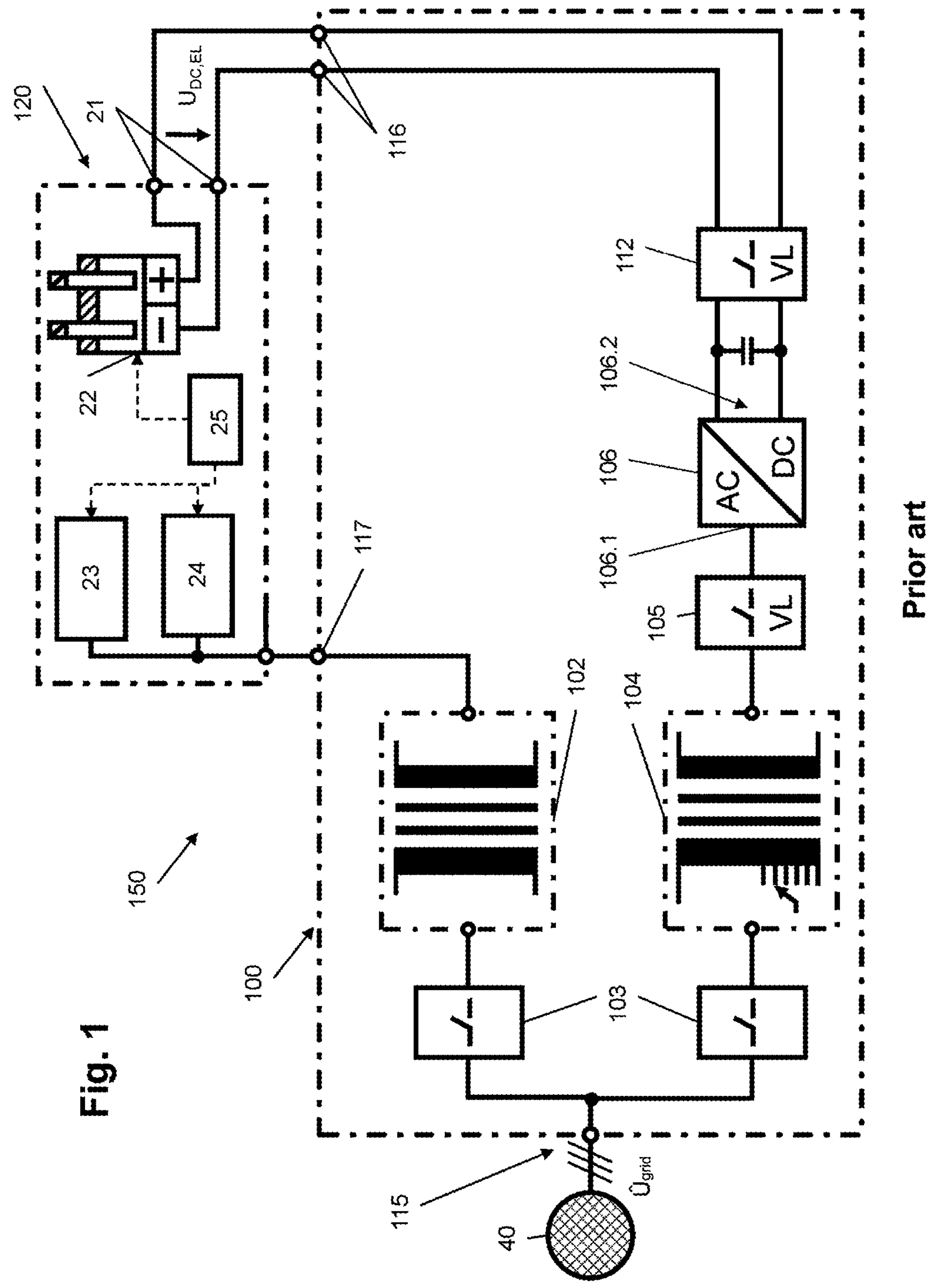
Fig. 1 Prior art
FIG. 1 shows a conventional electrolysis installation in a first variant.
Figure 2:
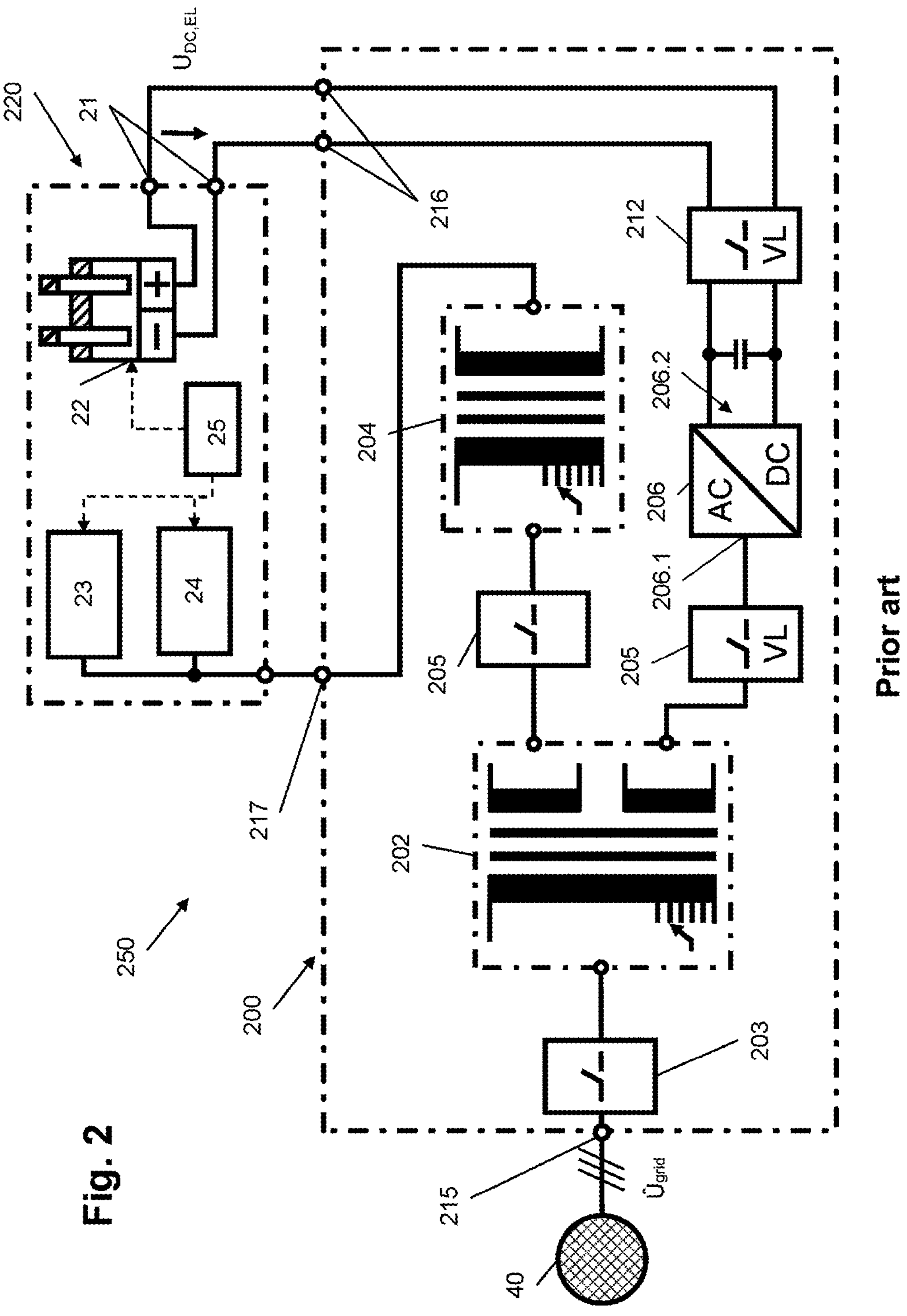
FIG. 2 shows a conventional electrolysis installation in a second variant.
Figure 3:
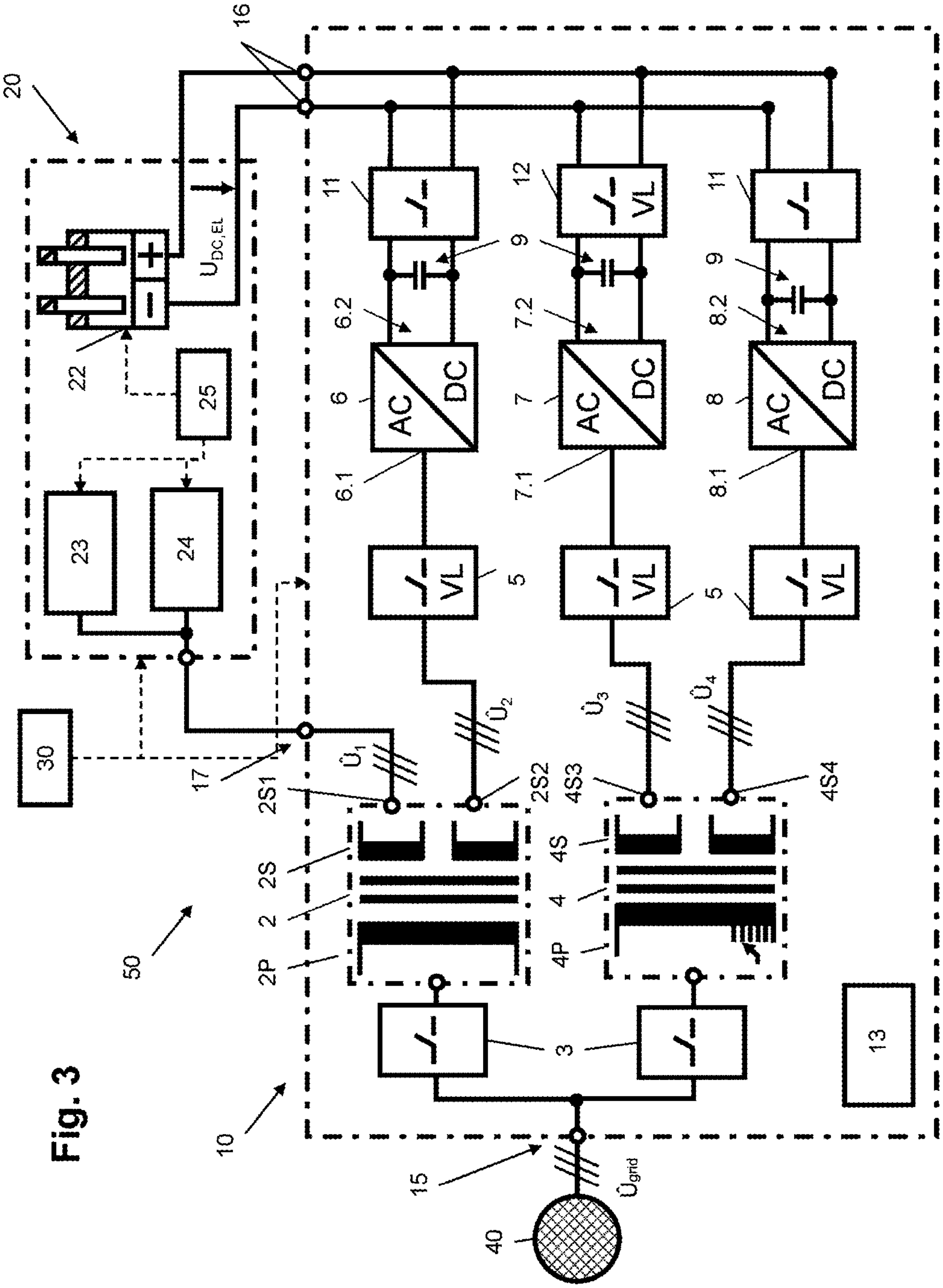
FIG. 3 shows an electrolysis installation according to the disclosure having an energy supply device according to the disclosure, in an embodiment.

FIG. 3 shows an electrolysis installation 50 according to the disclosure with an energy supply device 10 according to the disclosure. The electrolysis installation 50 comprises the energy supply device 10 according to the disclosure, an electrolysis unit 20, and a control unit 30. In the present disclosure, reference to the term unit is intended to cover any corresponding device, structure, component, circuit or circuitry, etc., and is not intended to be interpreted in a limiting fashion or as a nonce term.

The energy supply device 10 is described in detail below. The energy supply device 10 is connected to an energy supply grid 40 via a grid connection or terminal 15. An AC isolation unit 3 is arranged between the grid connection 15 and each of the transformers 2 and 4. The first transformer 2 is a multi-winding transformer and has a primary side 2P, connected to the grid connection 15, and a secondary side 2S. The secondary side 2S has a first secondary-side connection or terminal 2S1 and a second secondary-side connection or terminal 2S2. The first secondary-side connection 2S1 is connected to the electrolysis unit 20 via an auxiliary power output (or output terminal) 17 and supplies it with an alternating voltage with a first voltage amplitude $\hat{U}_1$. The second secondary-side connection 2S2 is connected to an AC connection 6.1 of a first AC/DC converter 6 via an AC isolation unit 5 with pre-charging means, mechanism or circuit VL, and supplies it with a second AC voltage amplitude $\hat{U}_2$. The first AC/DC converter 6 is connected with its DC connection 6.2 to a DC voltage output (or output terminal) 16 via an output capacitor 9 and a DC isolation unit 11. The first AC/DC converter 6 operates in a rectifying mode during operation of the electrolysis installation 50 and can convert the AC voltage at its AC connection 6.1 into a DC voltage at its DC connection 6.2, which is then also present at the DC voltage output 16 of the energy supply device 10 when the DC isolation unit 11 is closed.

By way of example, in one embodiment the second transformer 4 is configured as a multi-winding transformer and has a primary side 4P and a secondary side 4S. The secondary side 4S has a third secondary-side connection or terminal 4S3 and a fourth secondary-side connection or terminal 4S4. The third secondary-side connection 4S3 is connected via an AC isolation unit 5 with pre-charging means, mechanism or circuit VL to an AC connection 7.1 of a second AC/DC converter 7, and supplies it with an alternating voltage having a third AC voltage amplitude $\hat{U}_3$. Furthermore, the second AC/DC converter 7 is connected with its DC connection 7.2 to the DC voltage output 16 via an output capacitor 9 and a DC isolation unit 12, which has pre-charging means, mechanism or circuit VL. The second AC/DC converter 7 can convert the AC voltage at the AC connection 7.1 into a DC voltage at the DC connection 7.2, which is then present at the DC voltage output 16.

The fourth secondary-side connection 4S4 is connected to an AC connection 8.1 of a third AC/DC converter 8 via an AC isolation unit 5 with pre-charging means or circuitry, and supplies it with an alternating voltage having a fourth voltage amplitude $\hat{U}_4$. Furthermore, the third AC/DC converter 8 is connected with its DC connection 8.2 to the DC voltage output 16 via an output capacitor 9 and a DC isolation unit 12. The third AC/DC converter 8 can convert the AC voltage at the AC connection 8.1 into a DC voltage at its DC connection 8.2, which is then present at the DC voltage output 16. In other words, the AC/DC converters 6, 7, 8 can each convert an AC voltage with different voltage amplitudes $\hat{U}_2$, $\hat{U}_3$, $\hat{U}_4$ into a DC voltage and are connected to the DC voltage output 16 so that the DC voltage is present at the DC voltage output 16. The first AC/DC converter 6, and if applicable the further AC/DC converters 7, 8, can, in one embodiment, each be a transistor-based AC/DC converter. All AC isolation units 3, all AC isolation units 5 with pre-charging means or circuitry, all DC isolation units 11 and the DC isolation unit 12 with pre-charging means or circuitry, as well as the AC/DC converters 6, 7, 8, are controlled by the control unit 13 of the energy supply device 10—if necessary, also in combination with the overall control unit 30.

In the embodiment of FIG. 3, the output capacitors 9 are each shown as separate components which are connected to the DC connections 6.2, 7.2, 8.2 of the AC/DC converters 6, 7, 8 assigned to them. Alternatively, however, it is also possible for the output capacitors 9 to be at least partially, and possibly also completely, integrated into the AC/DC converters 6, 7, 8 respectively assigned to them, and therefore to be part of the AC/DC converters 6, 7, 8 respectively assigned to them.

The electrolysis unit 20 is described in detail below. The electrolysis unit 20 has an electrolyzer 22, an auxiliary unit 23, which can be, for example, a pump, an auxiliary unit 24, which can be, for example, a heater, and a control unit 25 of the electrolysis unit 22. Only two auxiliary units are shown as examples. However, it is within the scope of the disclosure for the electrolysis unit 20 to also have a different number of auxiliary units, in particular more than two auxiliary units, which are also electrically supplied via the auxiliary power output (or output terminal) 17 of the energy supply device 10. The direct current input (DC input) of the electrolyzer 22 is connected to the direct current output (or output terminal) 16 of the energy supply device 10 and is supplied with a direct current by this device. The auxiliary units 23, 24 are supplied with an alternating voltage by the energy supply device 10 via the auxiliary power output 17. The control unit 25 of the electrolysis unit controls the electrolyzer 22 and the auxiliary units 23, 24.

In one embodiment, the control unit (e.g., circuit) 30 of the electrolysis installation 50 issues control commands to both the energy supply device 10 and the electrolysis unit 20, and operates as a higher-level control unit during operation of the electrolysis installation 50. The control unit 30 thus enables the energy supply device 10 and the electrolysis unit 20 to be controlled in such a way that smooth operation of the electrolysis unit 20 is ensured. The higher-level control unit 30 is shown in FIG. 3 as a separate component. Alternatively, however, it is also possible for higher-level control functions to also be processed within the control unit 13 of the energy supply device 10 and/or the control unit 25 of the electrolysis unit 22. In this case, it is possible for the higher-level control unit 30 to not be present as a separate component, but, rather, incorporated into at least one of the control units 13, 25.

In the following, an operation of the electrolysis installation 50 is described using the example of starting up the electrolysis installation 50. For this purpose, it is assumed that all AC isolation units 3, 5 and all DC isolation units 11, 12 are open (e.g., creating an open circuit condition in the respective conduction path). Furthermore, the transformation ratios of the transformers 2, 4 are selected, by way of example, such that the following holds for the voltage amplitudes: $\hat{U}_2$, $\hat{U}_3$, $\hat{U}_4$: $\hat{U}_2>\hat{U}_4>\hat{U}_3$. The first voltage amplitude $\hat{U}_1$ is set to a value required to supply the auxiliary units 23, 24, e.g., 400 V or 480 V, via the transformation ratio assigned to the first secondary-side connection 2S1 of the first multi-winding transformer 2. It is usually smaller than the second voltage amplitude $U_2$. It can optionally also be smaller than the fourth voltage amplitude $U_4$, or possibly also smaller than the third voltage amplitude $U_3$. First, the AC isolation units 3 are closed (e.g., enabling current conduction along the respective conduction path), whereby an alternating voltage of voltage amplitude $\hat{U}_1$ is generated via the first secondary-side connection 2S1 and provided to the auxiliary units 23, 24 of the electrolysis unit 22. Controlled via the control unit 25 of the electrolysis unit 20, these units can therefore take over the chemical supply of the electrolyzer 22 and bring it into an operational state. Furthermore, the AC isolation unit 5 assigned to the third secondary-side connection 4S3, and, if applicable, the other AC isolation units 5 that are still open, are closed. The pre-charging means VL contained in the AC isolation units 5 now carries out a current-limited pre-charging of the output capacitor 9 assigned to the second AC/DC converter 7, and, if applicable, also of those output capacitors 9 assigned to the further AC/DC converters 6, 8. Due to the different voltage amplitudes $\hat{U}_2$, $\hat{U}_3$, $\hat{U}_4$, the minimum possible voltages applied to the output capacitors 9 can also be different. Subsequently, the DC isolation unit 12 having a pre-charging means or circuit VL is closed, whereby the DC input of the electrolyzer 22 is pre-charged via the second AC/DC converter 7. If the DC voltage $U_{DC,EL}$ provided via the second AC/DC converter 7 reaches or exceeds an open-circuit voltage $U_0$ of the electrolyzer 20, an electrolysis reaction begins to take place therein.

In one embodiment, start-up and partial load operation of the electrolyzer 22 can be carried out with only the second AC/DC converter 7. An increasing power consumption of the electrolyzer 22 is controlled by a level of the DC voltage $U_{DC,EL}$ provided at the DC voltage output 16. If the DC voltage $U_{DC,EL}$ at the DC input of the electrolyzer 22 has sufficiently approached a DC voltage present at one of the further output capacitors 9, then the remaining DC isolation units 11, each of which is assigned to an AC/DC converter 6, 8 that is not yet connected to the electrolyzer 22, can be closed. Due to a sufficient approximation between a DC voltage applied to the output capacitors 9 and the DC voltage applied to the DC input of the electrolyzer 22, in one embodiment the corresponding DC isolation units 11 can each be designed without a pre-charging means or circuit VL.

The operation described above has been explained using the example of starting up the electrolysis installation 50 and a subsequent increase in power of the electrolyzer 22, in which the AC/DC converters 6, 7, 8 are successively connected to the electrolyzer 22 via the DC isolation units 11, 12 assigned to them. If the power of the electrolyzer 22 decreases, the AC/DC converters 6, 7, 8 can be separated again (e.g., disconnected from the conduction path) in reverse order by opening the corresponding DC isolation units 11, 12.

What is claimed is:

1. An energy supply device for an electrolysis unit, comprising:

a grid connection terminal configured to connect to an energy supply grid, a DC voltage output terminal configured to connect to an electrolyzer of the electrolysis unit, an auxiliary power output terminal configured to connect to at least one auxiliary unit of the electrolysis unit, a first multi-winding transformer having a primary side, connected to the grid connection terminal, and a secondary side, a second transformer with a primary side, connected to the grid connection terminal, and a secondary side, wherein the secondary side of the first multi-winding transformer has a first secondary-side connection and a second secondary-side connection galvanically isolated therefrom, wherein the first secondary-side connection provides a first voltage amplitude $\hat{U}_1$ and is connected to the auxiliary power output terminal, and wherein the second secondary-side connection provides a second voltage amplitude $\hat{U}_2$ and is connected to an AC connection of a first AC/DC converter, a DC connection of which is connected to the DC voltage output terminal, and wherein the secondary side of the second transformer has a third secondary-side connection providing a third voltage amplitude $\hat{U}_3$ and is connected to an AC connection of a second AC/DC converter, a DC connection of which is connected to the DC voltage output terminal, and wherein the primary side and the first secondary-side connection of the first multi-winding transformer or the primary side and the secondary side of the first multi-winding transformer do not comprise a tap changer.

2. The energy supply device according to claim 1, wherein the secondary side of the second transformer has a fourth secondary-side connection which provides a fourth voltage amplitude $\hat{U}_4$ and is connected to an AC connection of a third AC/DC converter, a DC connection of which is connected to the DC voltage output terminal.

3. The energy supply device according to claim 2, wherein a nominal power of the third secondary-side connection is different from a nominal power of the fourth secondary-side connection.

4. The energy supply device according to claim 1, wherein the first AC/DC converter comprises a transistor-based AC/DC converter.

5. The energy supply device according to claim 4, wherein the second AC/DC converter and/or the third AC/DC converter comprises a transistor based AC/DC converter.

6. The energy supply device according to claim 1, wherein the second transformer comprises a tap changer on its primary side or its secondary side.

7. The energy supply device according to claim 1, wherein at least one AC/DC converter is connected on an AC side thereof to its respective transformer via an AC isolation unit having pre-charging circuitry.

8. The energy supply device according to claim 1, wherein, between each of the AC/DC converters and the DC voltage output terminal there is arranged a DC isolation unit of which one or more of the DC isolation units are free of a pre-charging circuit.

9. The energy supply device according to claim 1, wherein the second voltage amplitude $\hat{U}_2$ is greater than the third voltage amplitude $\hat{U}_3$.

10. The energy supply device according to claim 1, wherein the second transformer comprises a multi-winding transformer, and wherein the first multi-winding transformer and the second transformer have the same nominal power.

11. The energy supply device according to claim 1, wherein the second secondary-side connection has a nominal power that is different by at least 10% from that of the first secondary-side connection.

12. The energy supply device according to claim 1, wherein the second secondary-side connection has a nominal power higher than half the nominal power present at the secondary side of the second transformer.

13. The energy supply device according to claim 1, wherein the energy supply device is configured for connection to a medium-voltage grid as the energy supply grid.

14. The energy supply device according to claim 1, wherein the first multi-winding transformer comprises a three-winding transformer with a primary winding and two separate secondary windings.

15. The energy supply device according to claim 1, wherein the first multi-winding transformer comprises a four-winding transformer with two primary windings and two separate secondary windings.

16. An electrolysis installation, comprising:

an electrolysis unit with an electrolyzer and at least one auxiliary unit for a chemical supply of the electrolyzer, and an energy supply device comprising:

a grid connection terminal configured to connect to an energy supply grid, a DC voltage output terminal configured to connect to the electrolyzer of the electrolysis unit, an auxiliary power output terminal configured to connect to the at least one auxiliary unit of the electrolysis unit, a first multi-winding transformer having a primary side, connected to the grid connection terminal, and a secondary side, a second transformer with a primary side, connected to the grid connection terminal, and a secondary side, wherein the secondary side of the first multi-winding transformer has a first secondary-side connection and a second secondary-side connection galvanically isolated therefrom, wherein the first secondary-side connection provides a first voltage amplitude $\hat{U}_1$ and is connected to the auxiliary power output terminal, and wherein the second secondary-side connection provides a second voltage amplitude $\hat{U}_2$ and is connected to an AC connection of a first AC/DC converter, a DC connection of which is connected to the DC voltage output terminal, and wherein the secondary side of the second transformer has a third secondary-side connection which provides a third voltage amplitude $\hat{U}_3$ and is connected to an AC connection of a second AC/DC converter, a DC connection of which is connected to the DC voltage output terminal, and wherein the primary side and the first secondary-side connection of the first multi-winding transformer or the primary side and the secondary side of the first multi-winding transformer do not comprise a tap changer, wherein the DC voltage output terminal of the energy supply device is connected to the electrolyzer and the auxiliary power output terminal of the energy supply device is connected to the at least one auxiliary unit of the electrolysis unit.

* * * * *